(12) United States Patent
Hayashi et al.

(10) Patent No.: US 8,443,871 B2
(45) Date of Patent: May 21, 2013

(54) TEMPERATURE CONTROL APPARATUS FOR HEATING A SIDE DOOR OF A VEHICLE

(75) Inventors: Kengo Hayashi, Saitama (JP); Daisuke Yamaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1675 days.

(21) Appl. No.: 11/725,684

(22) Filed: Mar. 20, 2007

(65) Prior Publication Data

US 2007/0221360 A1 Sep. 27, 2007

(30) Foreign Application Priority Data

Mar. 27, 2006 (JP) ................. 2006-086589

(51) Int. Cl.
*B60H 1/00* (2006.01)
*B60H 3/00* (2006.01)
*F28F 27/00* (2006.01)

(52) U.S. Cl.
USPC ............. 165/202; 165/272; 165/277; 165/42; 180/68.4

(58) Field of Classification Search
USPC ................ 165/41, 42, 43, 44, 202, 203, 204, 165/271, 272, 273, 274, 275, 276, 277; 180/68.1, 68.2, 68.3, 68.4
See application file for complete search history.

(56) References Cited

U.S. PATENT DOCUMENTS

| | | | | |
|---|---|---|---|---|
| 3,332,476 A | * | 7/1967 | McDougal | 165/51 |
| 3,399,717 A | * | 9/1968 | Cline | 165/276 |
| 3,519,490 A | * | 7/1970 | Lieberman | 136/202 |
| 3,604,503 A | * | 9/1971 | Feldman et al. | 165/274 |
| 3,637,007 A | * | 1/1972 | Shlosinger | 165/272 |
| 3,640,090 A | * | 2/1972 | Ares | 165/104.26 |
| 3,749,156 A | * | 7/1973 | Fletcher et al. | 165/276 |
| 3,957,107 A | * | 5/1976 | Altoz et al. | 165/276 |
| 4,051,890 A | * | 10/1977 | Melchior | 165/276 |
| 4,212,346 A | * | 7/1980 | Boyd | 165/277 |
| 4,295,520 A | * | 10/1981 | Wulf | 165/41 |
| 4,296,796 A | * | 10/1981 | Wulf | 165/41 |
| 4,402,358 A | * | 9/1983 | Wolf | 165/276 |
| 4,842,045 A | * | 6/1989 | Reinmuller | 165/41 |
| 4,903,581 A | * | 2/1990 | Nilsson | 454/124 |
| 5,042,567 A | * | 8/1991 | Kajimoto et al. | 165/42 |
| 7,159,651 B2 | * | 1/2007 | Ito et al. | 165/202 |
| 7,422,050 B2 | * | 9/2008 | Araki | 165/43 |
| 7,434,608 B2 | * | 10/2008 | Shindo et al. | 165/41 |
| 2005/0126749 A1 | * | 6/2005 | Matti et al. | 165/41 |
| 2006/0006681 A1 | * | 1/2006 | Newbill | 293/117 |
| 2007/0127210 A1 | * | 6/2007 | Mahalingam et al. | 165/41 |

FOREIGN PATENT DOCUMENTS

| FR | 2 844 482 A1 | * | 3/2004 |
|---|---|---|---|
| GB | 2 270 375 A | * | 3/1994 |
| JP | 57-51513 A | * | 3/1982 |

(Continued)

*Primary Examiner* — Ljiljana Ciric
(74) *Attorney, Agent, or Firm* — Carrier Blackman & Associates, P.C.; William D. Blackman; Joseph P. Carrier

(57) ABSTRACT

A temperature control apparatus, for radiating heat from a side door to a vehicle interior, includes components which are provided inside each of the vehicle body and side door, respectively. A heat source is disposed within a peripheral edge part of an opening in a vehicle body. A heat pipe is provided in the side door. When the door opening is closed by the side door, the heat source and heat pipe come into contact, and are thermally connected by a heat transmission mechanism.

11 Claims, 9 Drawing Sheets

FOREIGN PATENT DOCUMENTS

| | | | |
|---|---|---|---|
| JP | 60-252022 A | * | 12/1985 |
| JP | 2-141324 A | * | 5/1990 |
| JP | 2-310119 A | * | 12/1990 |
| JP | 04-62206 | | 5/1992 |
| JP | 06-29066 | | 8/1994 |
| JP | 07-42489 Y2 | | 10/1995 |
| JP | 11-129732 | | 5/1999 |

* cited by examiner

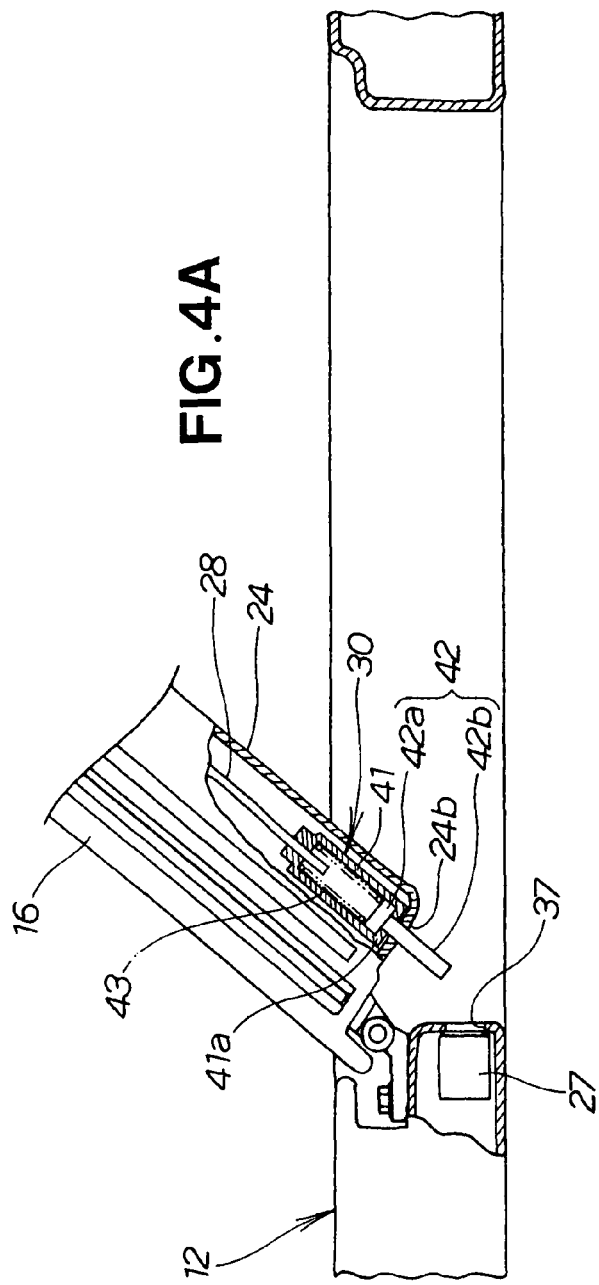
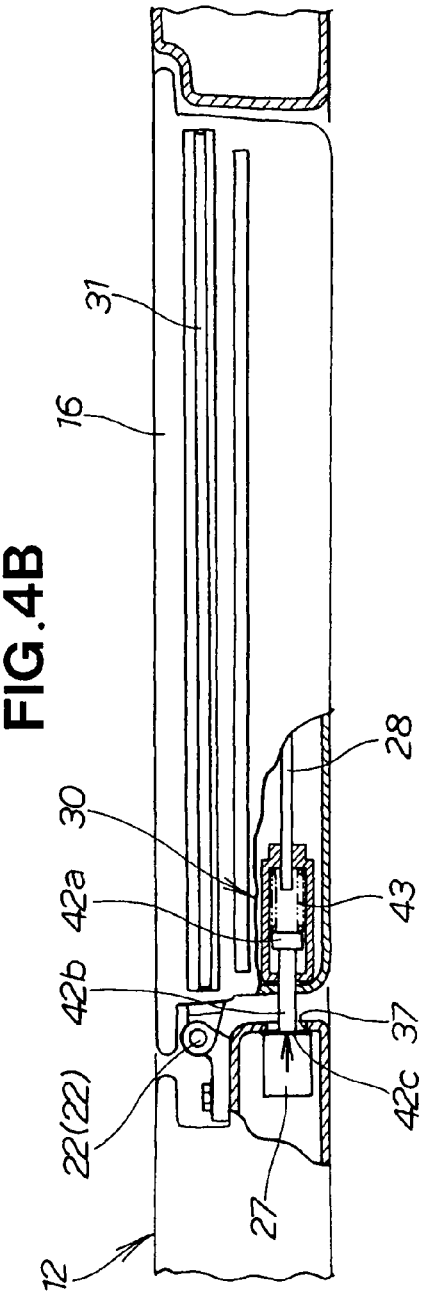

TEMPERATURE CONTROL APPARATUS FOR HEATING A SIDE DOOR OF A VEHICLE

CROSS-REFERENCE TO RELATED APPLICATIONS

The present application claims priority based on Japanese patent application 2006-086589, filed Mar. 27, 2006. The subject matter of this priority document, including specification, claims, and drawings, is incorporated by reference herein.

FIELD OF THE INVENTION

The present invention relates to a temperature control apparatus for a vehicle which is comprised of a body with an opening, and an opening/closing member capable of opening and closing actions relative to the opening.

BACKGROUND OF THE INVENTION

There are vehicles that have a rear heater apparatus, such as that disclosed in Japanese Patent Laid-Open Publication No. 11-129732, in which a diffusion outlet is provided to a sliding door formed on a central part of a side panel in the vehicle body, and hot air is blown out into a vehicle interior via the diffusion outlet.

The rear heater apparatus has a heater unit provided to the side panel, a vehicle body-side duct that is connected to the heater unit and has a vehicle body-side connecting opening positioned at a rear edge part of a door opening of the side panel, a sliding-door-side duct that is disposed on an inside surface of the sliding door and has a door-side connecting opening disposed so as to face the vehicle body-side connecting opening, and a connecting duct for connecting the two connecting openings based on the movement of the sliding door between the door-side connecting opening and the vehicle body-side connecting opening.

In the rear heater apparatus, when the sliding door is closed, the door-side connecting opening and vehicle body-side connecting opening are connected via the connecting duct. Hot air blown out from the heater unit is directed to the door connecting opening via the vehicle body-side duct and blown out into the vehicle interior from the diffusion outlet via the sliding-door-side duct.

However, in the rear heater apparatus, the duct is provided to the inside surface of the sliding door and therefore adversely affects the appearance of the vehicle interior.

In order to resolve this problem, a configuration is considered in which the duct is accommodated inside the sliding door. However, the duct is formed to direct the hot air, and therefore assumes a relatively large external profile.

On the other hand, the sliding door is relatively thin. For this reason, when the duct is accommodated within the sliding door, the location where the duct is to be accommodated is restricted. When the location where the duct is to be accommodated is restricted, the hot air will not readily be blown against the entire door glass and, for example, the location against which the hot air is blown must be limited to a position where the field of view of a side mirror is not hindered.

In addition, there are vehicles that have a thermostat, such as is disclosed in Japanese Utility Model Post-Exam Publication No. 06-29066, in which a hardboard is mounted in a side door, a heat-generating sheet is provided to the hardboard in a substantially vertical state, a heat-generating layer is provided to the heat-generating sheet, the heat-generating layer is connected to a power source via a harness on the vehicle body-side, and the heat-generating layer is kept at a suitable temperature.

In this vehicle, the heat-generating layer is promptly heated when the engine first starts to operate and other such times, the resulting heat radiates into the vehicle interior, and the vehicle occupant is made comfortable. In addition, the heat-generating sheet is installed within the side door, thereby allowing the side door to maintain an attractive outer appearance.

In the vehicle, a hardboard is necessary in order to support the heat-generating sheet in a substantially vertical state. The hardboard must support the entire body of the heat-generating sheet, and a relatively large board is used. In order to mount the hardboard in the side door, a relatively large space must be maintained within the side door. For this reason, a space in which to mount the hardboard is difficult to maintain in the side door, and considerable scope for improvement remains in this regard.

SUMMARY OF THE INVENTION

It is therefore an object of the present invention to provide a temperature control apparatus for a vehicle that can promptly heat a vehicle interior, that can be mounted uncomplicatedly in a side door, and that can keep the outer appearance looking attractive.

According to an aspect of the present invention, there is provided a temperature control apparatus for a vehicle, which comprises: an opening/closing member capable of opening and closing actions relative to an opening formed in a body of the vehicle; a heat source provided to the vehicle body; a heat pipe disposed within the opening/closing member for transmitting heat from the heat source; and a heat transmission mechanism for thermally connecting the heat pipe and the heat source when the opening is closed by the opening/closing member.

By virtue of the heat transmission mechanism, heat is transmitted effectively from the heat source to the heat pipe. Accordingly, the heat pipe can be favorably heated, heat from the pipe will be radiated to the vehicle interior, and a vehicle occupant will be promptly made comfortable.

Furthermore, in the present invention, the heat pipe is provided to the interior of the opening/closing member. Thus, the heat pipe is a member used solely for transmitting heat from the heat source and can be bent relatively freely. The heat pipe can readily be accommodated in a pre-existing space in the opening/closing member when the heat pipe is mounted on the opening/closing member. Thus, the heat pipe is provided to the interior of the opening/closing member, whereby the heat pipe is hidden from view by the opening/closing member, and the outward appearance of the opening/closing member remains attractive.

Preferably, the heat source is accommodated in an accommodating part provided to a peripheral edge part of the opening, and the accommodating part has a connecting opening that faces the heat transmission mechanism. For this reason, a thermal connection is readily established between the heat transmission mechanism and the heat source.

Desirably, the heat pipe is mounted on a lining using a mounting piece while the lining having the heat pipe is mounted on the opening/closing member. The process of assembling the opening/closing member and the lining is simplified.

In a preferred form, the heat transmission mechanism has a push bar comprised of a heat-transmitting material urged by a spring force in a direction of the heat source so as to be connected with the heat source. The heat transmission mechanism and heat source are connected merely by the push bar resisting the springing force and being pushed.

The lining may have a fan for guiding the heat from the heat pipe toward a shutter provided to the lining. When the shutter is open, heat is sent by the fan in the opening direction of the shutter.

Preferably, the shutter is disposed in the vicinity of a window provided to the opening/closing member. As a result, heat from the heat pipe is blown toward the window. The shutter has an openable and closeable shielding blade.

Desirably, the heat transmission mechanism comprises hinges for connecting the opening/closing member and the vehicle body. The hinges on the vehicle body can transmit heat from the heat source while the hinges on the opening/closing member can transmit the heat to the heat pipe. This arrangement is preferable in that a special heat transmission mechanism is rendered unnecessary.

Preferably, the heat transmission mechanism comprises a latch formed of a heat-transmitting material and provided to one of the opening/closing member and the vehicle body, and a striker formed of a heat-transmitting material and provided to the other one of the opening/closing member and the vehicle body for engaging with the latch, so that the heat source and heat pipe are capable of transmitting heat upon engagement of the latch and striker.

In a preferred form, the heat source is designed to heat or cool the heat pipe.

BRIEF DESCRIPTION OF THE DRAWINGS

Certain preferred embodiments of the present invention shall be described in detail below, by way of example only, with reference to the accompanying drawings, wherein:

FIGS. 4A and 4B are partial cross-sectional views showing a state in which a heat source and the heat transmission mechanism are connected;

DESCRIPTION OF THE PREFERRED EMBODIMENTS

Figure 1:
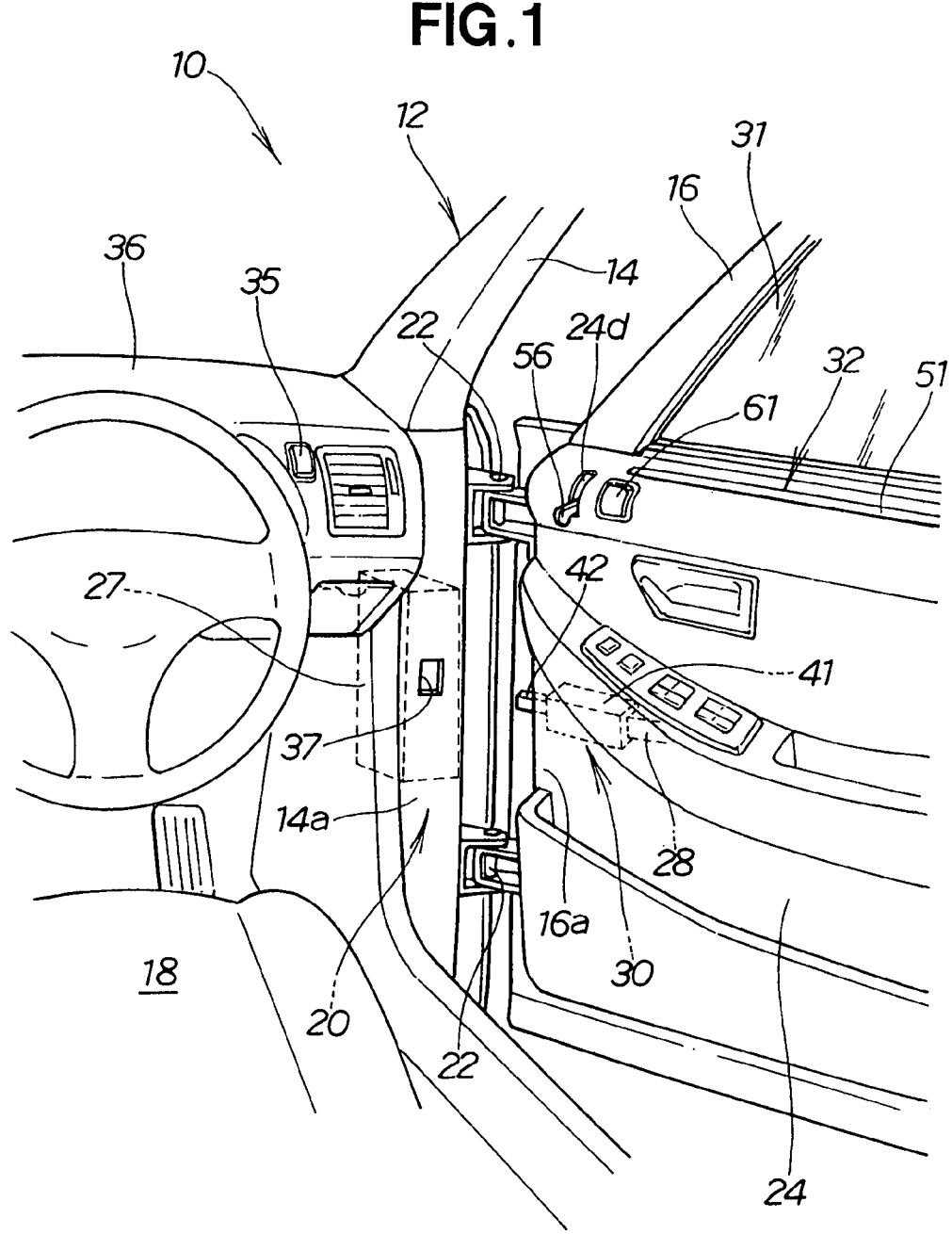
FIG. 1 is a perspective view showing a vehicle having a temperature control apparatus according to a first embodiment of the present invention.
Figure 2:
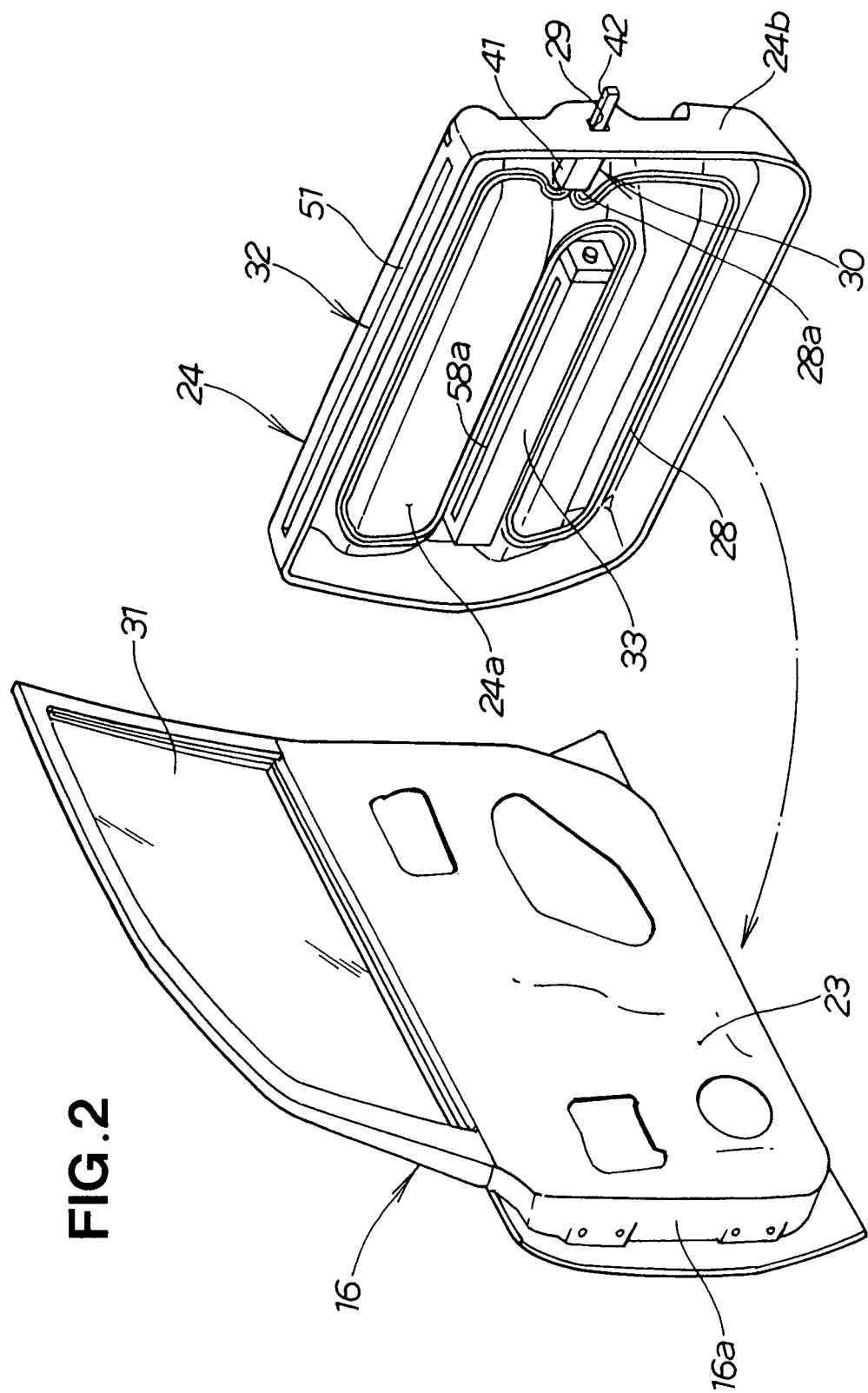
FIG. 2 is an exploded perspective view of a side door shown in FIG. 1.

Reference is now made to FIGS. 1 through 5 showing a temperature control apparatus according to a first embodiment of the present invention;

In FIGS. 1 and 2, a vehicle 10 has an opening 14 provided to a side part of a vehicle body 12, a side door (opening/closing member) 16 for opening and closing the opening 14, and a temperature control apparatus 20 for radiating heat from the side door 16 to a vehicle interior 18.

A front edge part 16a of the side door 16 is swingably mounted on a front edge part 14a of the opening 14 via upper and lower hinge members 22, 22. The side door 16 swings using the upper and lower hinge members 22, 22 as axes, whereby the opening 14 is opened and closed.

A lining 24 is provided to an inner panel 23 of the side door 16. The lining 24 is an interior finishing material that faces the vehicle interior 18 and that forms a wall part of the vehicle interior 18. A space 26 (FIG. 5) is formed between the inner panel 23 and the lining 24.

The temperature control apparatus 20 comprises a heat source 27 provided to the vehicle body 12, a heat pipe 28 for directing heat from the heat source 27, a heat transmission mechanism 30 provided to the heat pipe 28, a shutter mechanism 32 for guiding the heat from the heat pipe 28 toward a door glass 31, and an electric fan 33 for directing the heat from the heat pipe 28 toward the shutter mechanism 32.

The heat source 27 is housed in the front edge part 14a of the opening 14. An electric heater apparatus is an example of a heat source. The heat source 27 is electrically connected to a power source (not shown) of the vehicle 10 via a heater switch 35. The heater switch 35 is provided to an instrument panel 36.

When the heater switch 35 is switched on in a state in which a main switch (not shown) of the vehicle 10 has been switched on, electricity is supplied to the heat source 27 and the heat source 27 is heated. A thermostat (not shown) for limiting the heating temperature to a certain value is provided to the heat source 27.

A connecting opening 37 for connecting the heat transmission mechanism 30 to the heat source 27 is provided to the front edge part 14a of the opening 14.

Figure 5:
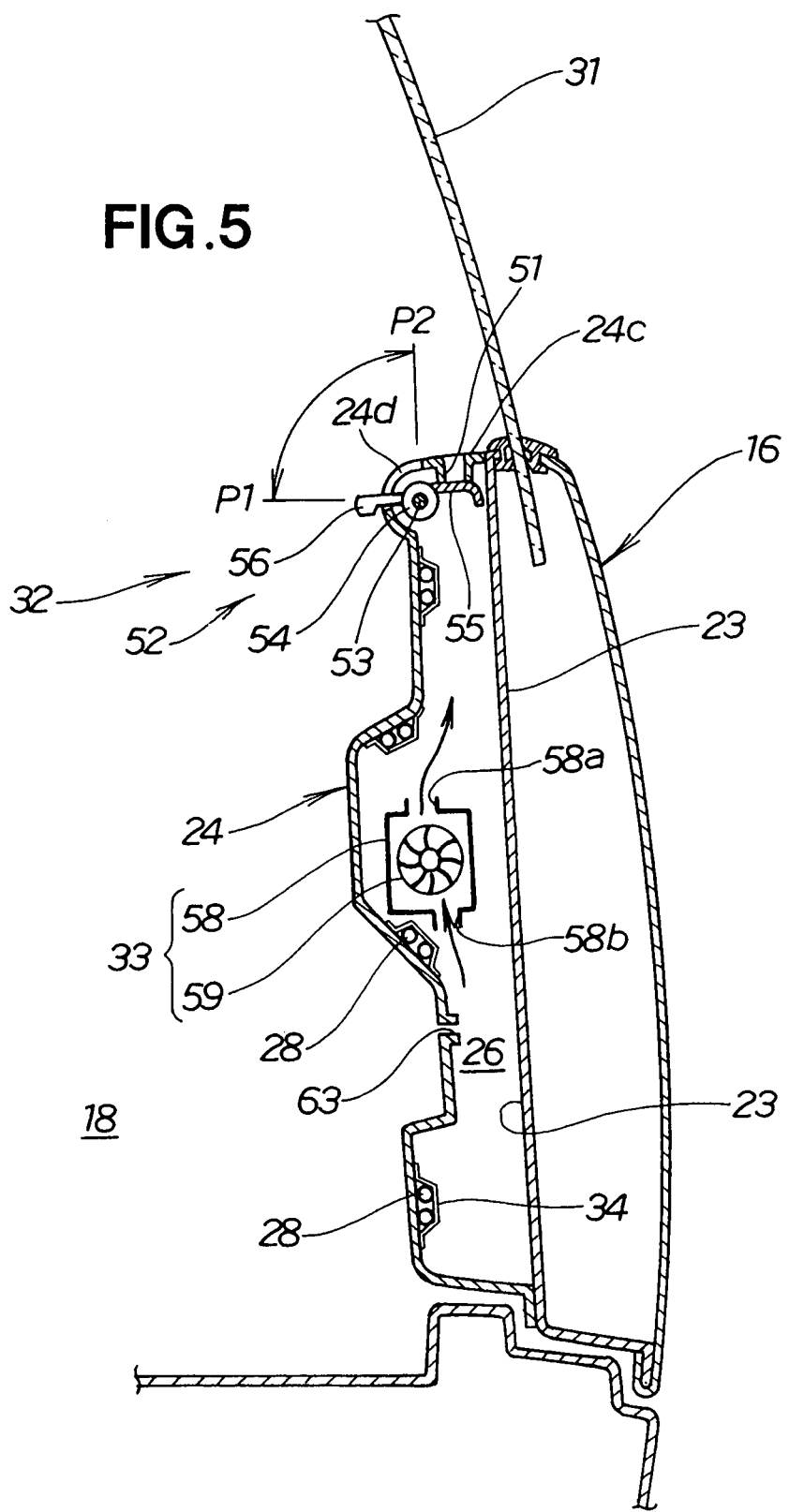
FIG. 5 is a cross-sectional view of the side door and a lining.

The heat pipe 28 is disposed in the side door 16 and mounted across an entire inside surface 24a of the lining 24 using a plurality of mounting pieces 34 (FIG. 5). The heat pipe 28 is composed of, e.g., copper (copper alloy), aluminum (aluminum alloy), or another material having exceptional thermal conductivity and a hollow shape, and has an end part 28a mounted on the heat transmission mechanism 30. The hollow part of the heat pipe 28 is filled with a heating medium, and heat from the heat source 27 is transmitted by the heating medium. Purified water is an example of a substance that can be used for the heating medium.

The heat pipe 28 is used solely for transmitting heat from the heat source 27 and can be bent relatively freely. Accordingly, when the heat pipe 28 is mounted, for example, the heat pipe 28 can readily be accommodated in a pre-existing space, and the heat pipe 28 can be readily accommodated within the side door 16. Thus, the heat pipe 28 is provided to the interior of the side door 16, thereby allowing the heat pipe 28 to be hidden from view by the side door 16, and improving the outer appearance of the side door 16.

Figure 3:
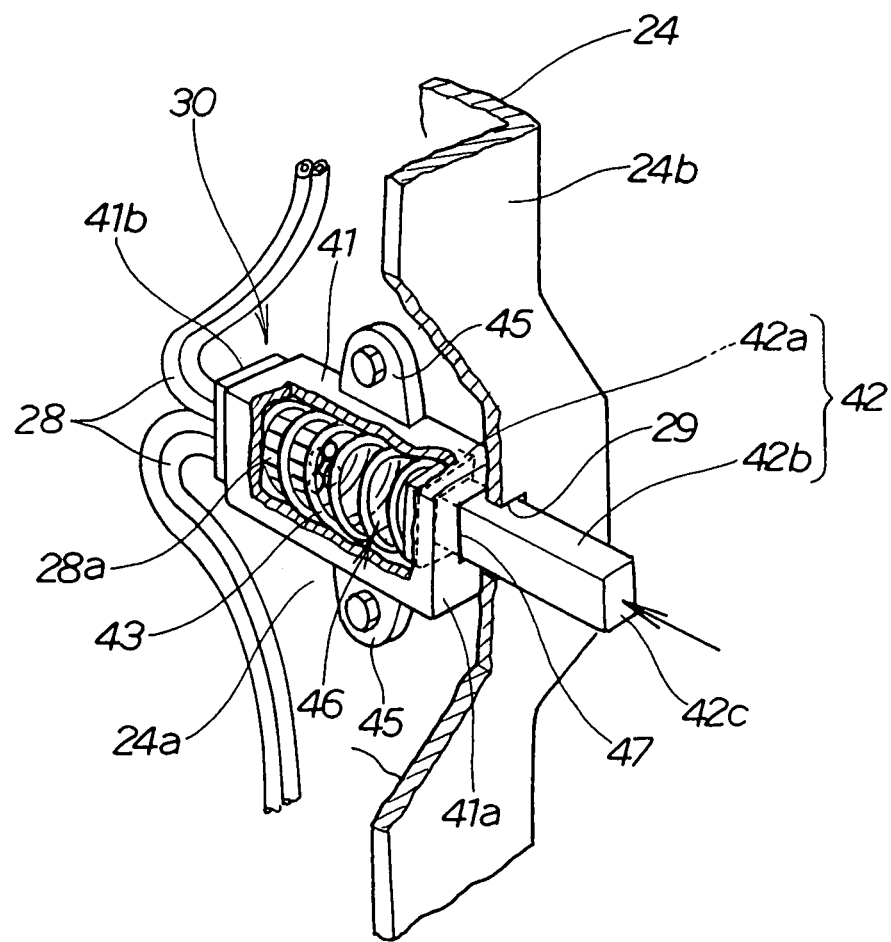
FIG. 3 is a perspective view showing an interior of a cutout portion of a heat transmission mechanism shown in FIG. 2.

As shown in FIG. 3, the heat transmission mechanism 30 has a case 41 mounted on the inside surface 24a of the lining 24, a push bar 42 protruding from a front end part 41a of the case 41 toward the front of the vehicle body, and a compression spring 43 that is accommodated within the case 41 and that presses the push bar 42 forward.

The case 41 has mounting brackets 45, 45 provided to an upper part and a lower part, a hollow part 46 formed in the interior, and front and rear openings 47, 48 (FIG. 4) formed on front and rear end parts 41a, 41b, respectively.

The mounting brackets 45, 45 are members for mounting the case 41 to the inside surface 24a of the lining 24.

A base part 42a of the push bar 42 is disposed in the hollow part 46 of the case 41, and a bar main body 42b of the push bar 42 protrudes from a front opening 47 of the case 41 and an opening 29 formed on a front wall 24b of the lining 24 toward the front of the vehicle body.

The base part 42a is pressed by the compression spring 43 of the hollow part 46, whereby the base part 42a is brought into contact with the front end part 41a of the case 41.

When a distal end part 42c of the bar main body 42b is subjected to a compression force as indicated by the arrow, the compression spring 43 is compressed by the base part 42a and the bar main body 42b enters the case 41.

The end part 28a of the heat pipe 28 is inserted into the case 41 (hollow part 46) from a rear opening 48 of the case 41.

The case 41 and push bar 42 are formed from, e.g., copper (copper alloy), aluminum (aluminum alloy), or another material having exceptional thermal conductivity.

Accordingly, the distal end part 42c of the bar main body 42b is brought into contact with the heat source 27 (FIG. 1), whereby heat from the heat source 27 is effectively transmitted to the heat pipe 28 via the push bar 42 and case 41.

The mounting brackets 45, 45 and the case 41 are formed as separate members, which allows the mounting brackets 45, 45 to also be formed using, e.g., copper or a resin.

The connecting of the heat source and heat transmission mechanism in the temperature control apparatus of the first embodiment shall be described next with reference to FIGS. 4A and 4B.

In FIG. 4A, the heat pipe 28 is separated from the heat source 27 in a state in which the side door 16 is open. The base part 42a is brought into contact with the front end part 41a of the case 41 by the springing force of the compression spring 43.

The bar main body 42b of the push bar 42 protrudes from the front wall 24b of the lining 24 toward the front of the vehicle body.

In FIG. 4B, when the side door 16 is closed using the upper and lower hinge members 22, 22 as axes, the heat transmission mechanism 30 nears the heat source 27. The distal end part 42c of the bar main body 42b is brought into contact with the heat source 27 via the connecting opening 37.

In other words, the distal end part 42c of the bar main body 42b is subjected to a compression force as indicated by the arrow, the compression spring 43 is compressed by the base part 42a, the bar main body 42b enters the case 41, and the distal end part 42c of the bar main body 42b is securely brought into contact with the heat source 27. Thus, when the side door 16 is closed, the heat pipe 28 is thermally connected to the heat source 27.

In the heat transmission mechanism 30, the push bar 42 can be elevated by the compression spring 43, whereby manufacturing differences and assembling differences are compensated for, and the heat pipe 28 can be reliably brought into contact with the heat source 27.

The shutter mechanism 32 has a slit 51 formed on an upper part 24c of the lining 24 and a slit opening and closing part 52 for opening and closing the slit 51, as shown in FIG. 5.

The slit 51 is formed in the vicinity of the door glass 31 in a longitudinal direction of the vehicle body along the door glass 31, as shown in FIG. 4B.

In the slit opening and closing part 52, a rotating body 54 is rotatably provided to the lining 24 via a support shaft 53, a shielding blade 55 is provided to the rotating body 54, and an operating lever 56 (see also FIG. 1) is provided.

The shielding blade 55 extends along the longitudinal direction of the slit 51. The operating lever 56 protrudes from a guide hole 24d of the lining 24 toward the vehicle interior 18.

The operating lever 56 swings about the support shaft 53 between a closed position P1 and opened position P2 as indicated by the arrow.

The slit opening and closing part 52, is configured so that the operating lever 56 will be held at the closed position P1 or opened position P2 by, e.g., the force of friction between the support shaft 53 and rotating body 54.

Holding the operating lever 56 at the closed position P1 will cause the shielding blade 55 to keep the slit 51 in a closed state. Holding the operating lever 56 at the opened position P2 will cause the shielding blade 55 to separate from the slit 51 and the slit 51 will be kept in an opened state.

The electric fan 33 is provided below the slit 51 in the space 26 formed by the inner panel 23 and lining 24 of the side door 16 so as to extend in a horizontal direction to a position at a height that is substantially equal to the center of the lining 24 (see also FIG. 2).

The electric fan 33 has a casing 58 and a bladed wheel 59 rotatably provided in the casing 58.

The rotating of the bladed wheel 59 causes air in the vehicle interior 18 to be suctioned from a suction hole 58b into the casing 58 via a directing inlet 63 and the space 26. The suctioned air is blown from a diffusion outlet 58a of the casing 58 in an upward direction as indicated by the arrow.

The directing inlet 63 is composed of, e.g., a slit formed in the lining 24.

Air blown out from the diffusion outlet 58a of the electric fan 33 is subjected to heat-exchanging by the heat pipe 28, and returns into the vehicle interior 18.

A fan switch 61 shown in FIG. 1 is operated, whereby the electric fan 33 is switched between an operating state and a stopped state. The fan switch 61 is provided to the vicinity of the operating lever 56 of the lining 24.

An operation of the temperature control apparatus 20 of the first embodiment shall be described below with reference to FIGS. 6A and 6B through FIG. 8.

Figure 6A:
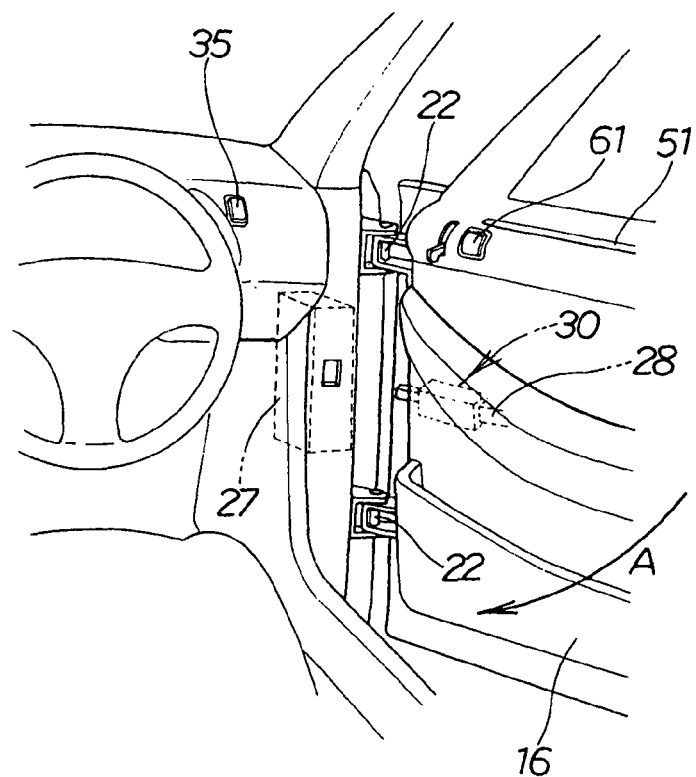
FIGS. 6A and 6B are schematic views showing a state in which the side door has been closed from an opened state.

As shown in FIG. 6A, the side door 16 closes as indicated by the arrow A using the upper and lower hinge members 22, 22 as axes.

Figure 6B:
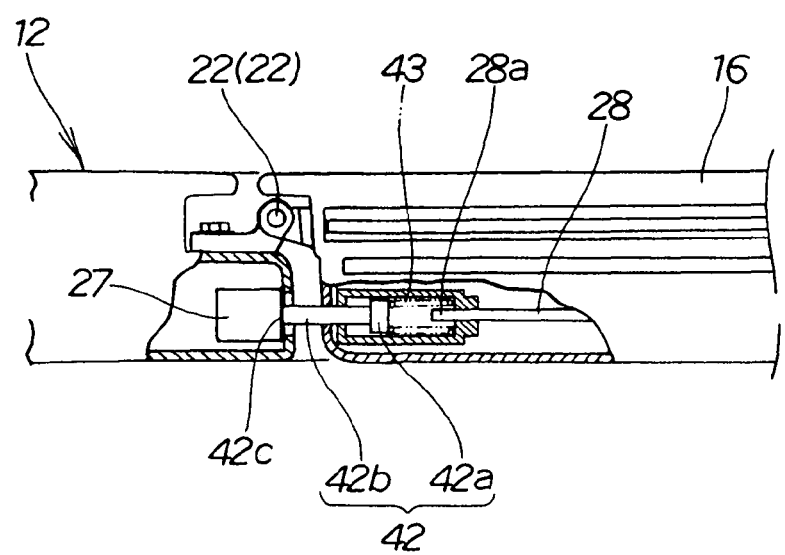

As shown in FIG. 6B, when the side door 16 is closed, the distal end part 42c of the bar main body 42b is brought into contact with the heat source 27 and the heat pipe 28 is thermally connected to the heat source 27.

Figure 7A:
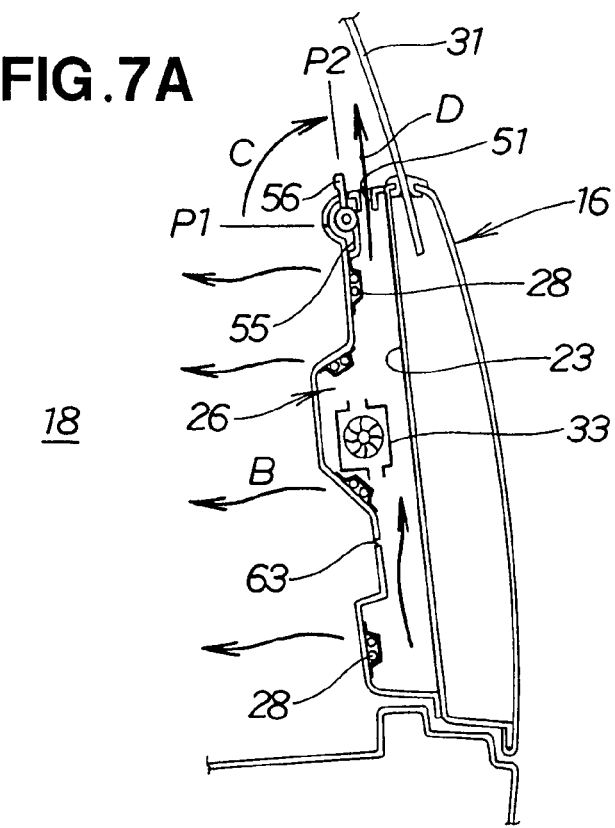
FIGS. 7A and 7B are schematic views showing the flow of heat from a heat pipe.
Figure 7B:
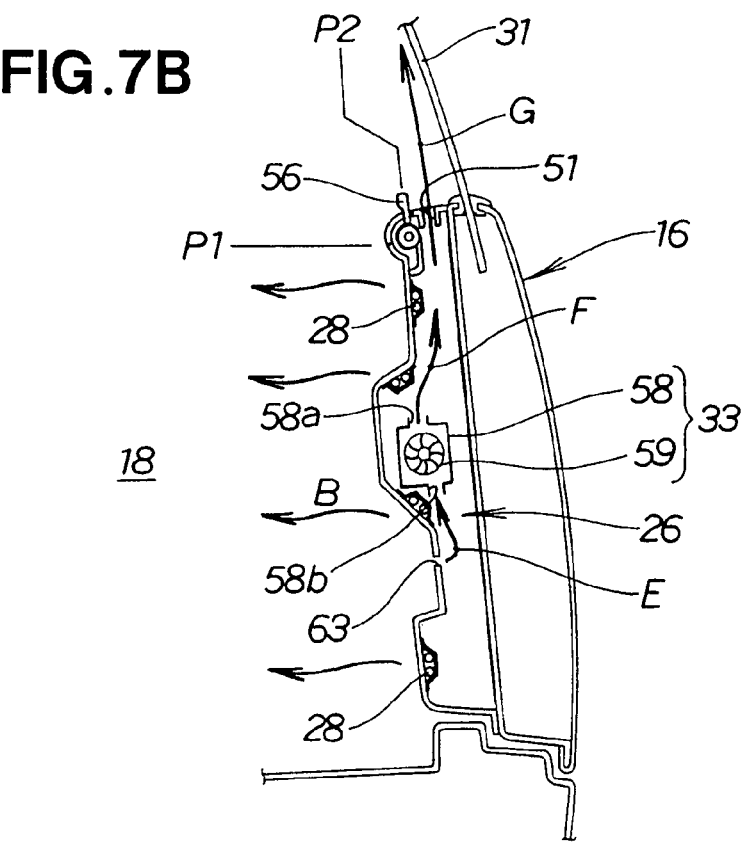

FIGS. 7A and 7B show an example in which the temperature control apparatus is used as a defroster in addition to being used to heat the vehicle interior.

In FIG. 7A, when the heater switch 35 (FIG. 1) is switched on with the main switch of the vehicle 10 in a switched-on state, electricity is supplied to the heat source 27 and the heat source 27 is heated. Heat from the heat source 27 is transmitted to the heat pipe 28, and the heat pipe 28 is heated to a predetermined temperature. The heat from the heat pipe 28 is radiated as indicated by the arrow B, and the vehicle interior 18 is heated.

When there is a difference between the temperature of the air outside and the air in the vehicle interior and condensation collects on an inner surface of the door glass 31, the operating lever 56 is brought toward the opened position P2 as indicated by the arrow C, and the slit 51 is opened. Heat from the heat pipe 28 then ascends (rises unassistedly) through the space 26 by convection. The heat ascends from the slit 51 along the entire area of the inner surface of the door glass 31 as indicated by the arrow D. Accordingly, the heat that ascends along the entire area of the inner surface of the door glass 31 eliminates the condensation on the inner surface of the door glass, heats the entire body of the door glass 31, increases the insulating effect of the door glass, and improves the heating effect.

In FIG. 7B, when the door glass 31 has clouded over, the fan switch 61 shown in FIG. 1 is switched on, and the electric fan 33 is switched to an operating state. The bladed wheel 59 rotates, whereby the air in the vehicle interior 18 is suctioned from the directing inlet 63 to the suction hole 58b of the casing 58 as indicated by the arrow E. The suctioned air is blown out from the diffusion outlet 58a of the casing 58 in the upward direction as indicated by the arrow F.

Air blown out from the diffusion outlet 58a is subjected to heat-exchange by the heat pipe 28, the heat from the heat pipe 28 is forcefully directed upwards through the space 26 and ascends from the slit 51 along the inner surface of the door glass 31 as indicated by the arrow G. Accordingly, the condensation on the inner surface can more preferably be eliminated by the heat that ascends along the inner surface of the door glass 31.

Figure 8:
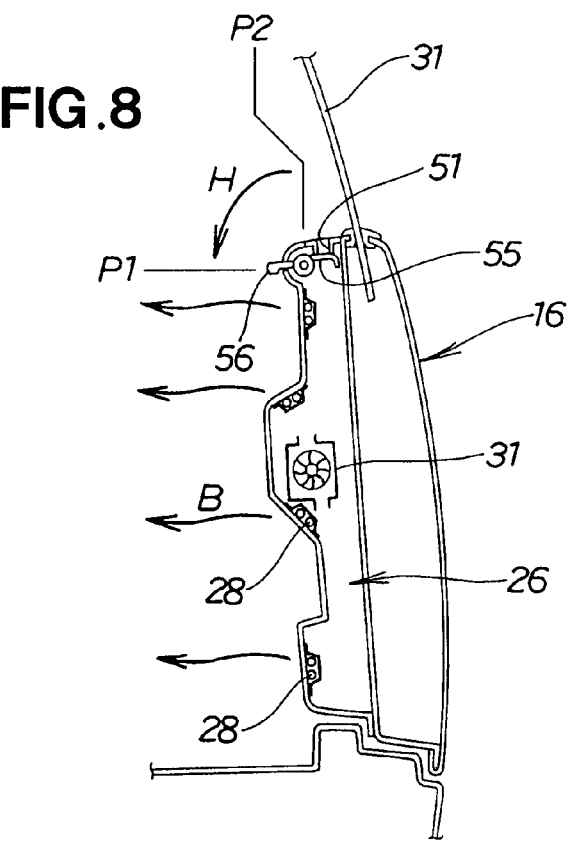
FIG. 8 is a perspective view showing an example in which the heat from the heat pipe is used only for heating the vehicle interior.

FIG. 8 shows an example in which the temperature control apparatus of the first embodiment is used only to heat the vehicle interior.

When the inner surface of the door glass 31 is not clouded over, the fan switch 61 shown in FIG. 1 is turned off, and the driving of the electric fan 33 is stopped.

The operating lever 56 is then moved to the closed position P1 as indicated by the arrow H, and the slit 51 is closed by the shielding blade 55. Accordingly, the heat from the heat pipe 28 radiates as indicated by the arrow B, and the vehicle interior is heated.

Temperature control apparatuses of a second embodiment and a third embodiment shall be described next with reference to FIGS. 9 and 10. In the descriptions of the second and third embodiments, members that are the same or similar to those of the temperature control apparatus 20 of the first embodiment are marked using the same symbols, and descriptions thereof are omitted.

Figure 9:
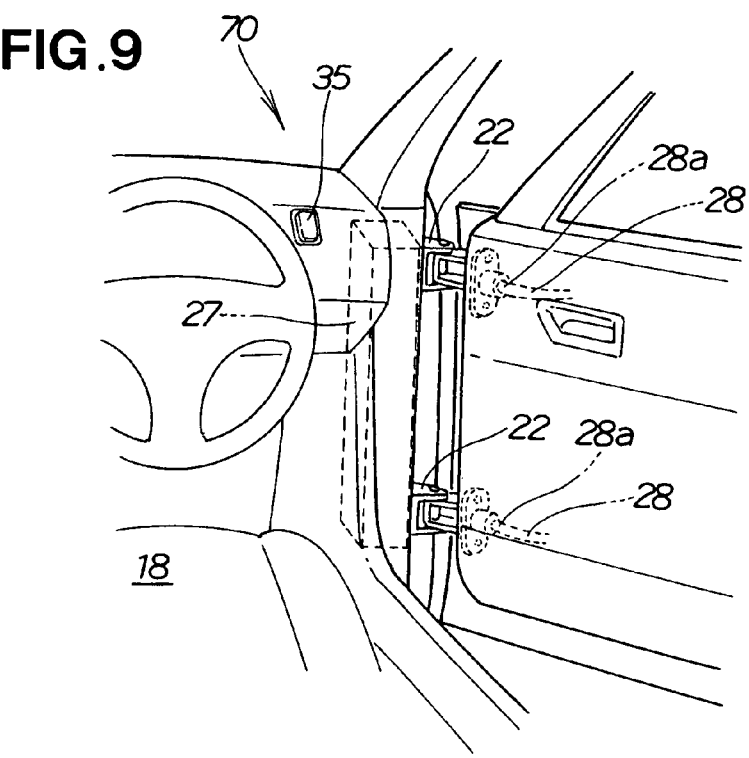
FIG. 9 is a perspective view of a temperature control apparatus according to a second embodiment of the present invention, showing an example in which a hinge is used as a heat transmission mechanism.

In a temperature control apparatus 70 of the second embodiment shown in FIG. 9 the upper and lower hinge members 22, 22 are used as heat transmission mechanisms instead of the heat transmission mechanism 30 of the first embodiment. The configuration is otherwise the same as that of the first embodiment.

The upper and lower hinge members 22, 22 that function as the heat transferring mechanism are formed from copper (copper alloy), aluminum (aluminum alloy), or another material having exceptional thermal conductivity. The member near the vehicle body is thermally connected to the heat source 27, and the member near the side door is thermally connected to the end part 28a of the heat pipe 28.

When the heat switch 35 is switched on, the heat source 27 is heated, and heat from the heat source 27 is transmitted to the heat pipe 28 via the upper and lower hinge members 22, 22.

The temperature control apparatus 70 of the second embodiment thus produces the same effect as the temperature control apparatus 20 of the first embodiment.

In the temperature control apparatus 70 of the second embodiment, the upper and lower hinge members 22, 22 can also serve as the heat transmission mechanism. Therefore, the number of components is reduced.

Figure 10:
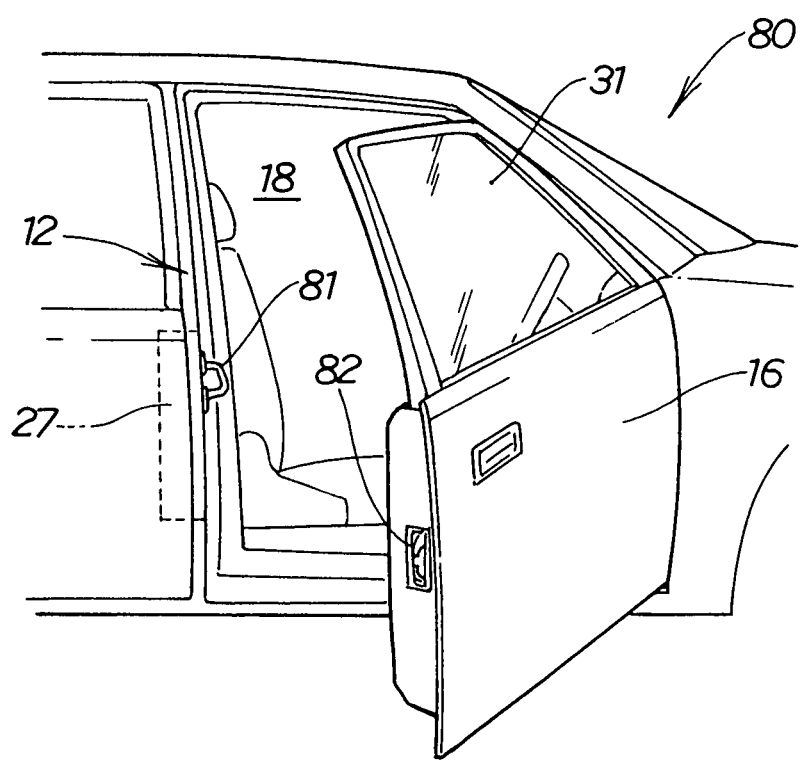
FIG. 10 is a perspective view of a temperature control apparatus according to a third embodiment of the present invention, showing an example in which a striker and a latch are used as a heat transmission mechanism.

In a temperature control apparatus 80 of the third embodiment shown in FIG. 10, a striker 81 and a latch mechanism 82 are used as the heat transmission mechanism instead of the heat transmission mechanism 30 of the first embodiment. The configuration is otherwise the same as that of the first embodiment.

The striker 81 and latch mechanism 82 that function as the heat transmission mechanism are formed from copper (copper alloy), aluminum (aluminum alloy), or another material having exceptional thermal conductivity. The striker 81 is thermally connected to the heat source 27 and the latch mechanism 82 is thermally connected to the end part of the heat pipe 28.

The closing of the side door will cause the latch mechanism 82 to engage with the striker 81, and the striker 81 and latch mechanism 82 will be thermally connected. When the heater switch 35 (FIG. 1) is switched on, the heat source 27 is heated, and heat from the heat source 27 is transmitted to the heat pipe 28 via the striker 81 and latch mechanism 82.

The temperature control apparatus 80 of the third embodiment thus produces the same effect as the temperature control apparatus 20 of the first embodiment.

In the temperature control apparatus 80 of the third embodiment, the striker 81 and latch mechanism 82 can also serve as the heat transmission mechanism. Therefore, the number of components is reduced.

In the present embodiments, an example was described in which the heat transmission mechanism 30 was provided to the heat pipe 28. However, this arrangement is not provided by way of limitation, and the same effect will be obtained even if the heat transmission mechanism 30 is provided to the heat source 27.

In the present embodiments, the heat transmission mechanism 30 was offered as an example of a mechanism capable of thermally connecting the heat pipe 28 to the heat source 27. However, the heat transmission mechanism is not limited to the configuration given in the example, and may be configured so that the heat pipe 28 can be directly connected to the heat source 27 when the side door 16 is closed.

The shape of the heat pipe 28 and the number of heat pipes shown in the drawings as the present embodiments can be arbitrarily altered in accordance with the shapes of the side door 16 and lining 24.

Examples were described in which the temperature control apparatuses of the present embodiments comprise an electric fan 33. However, this arrangement is not provided by way of limitation, and the same effect can be obtained even without the inclusion of the electric fan 33.

In the present embodiments, the opening and closing action of the slit 51 was configured to be controlled manually. However, the opening and closing action of the slit 51 may also be controlled electronically.

In the present embodiments, descriptions were provided of examples in which the temperature control apparatus 20 according to the present invention was used with a door glass 31. However, this arrangement is not provided by way of limitation and the temperature control apparatus may also be used with a rear door, a door mirror, or another location to eliminate condensation on a door glass or a mirror.

In the present embodiments, a description was given of an example of a hinge-type door opening and closing structure. However, according to, e.g., the first and third examples, the present invention can also be applied to a sliding door structure.

In the present embodiments, a description was given of an example in which an electric heater is used as the heat source 27. However, exhaust heat from, e.g., cooling water used for a source of power (an engine, fuel cell, or the like) in the vehicle or the like can also be used. Using the exhaust heat in this manner will enable the temperature control apparatus to be configured in an energy-saving manner.

In the present embodiments, a description was offered of an example in which the heat source 27 acts as a source for heating. However, a configuration can be used wherein, depending on the type of heating medium in the heat pipe. The heat source is cooled and the main body of the door can be cooled by the transmission of cold energy to the heat pipe by the heat transmission mechanism. For example, during the summer, using such a configuration will allow the vehicle interior 18 to be cooled by the cold energy of the heat pipe, and the vehicle interior 18 can be favorably kept cool.

Obviously, various minor changes and modifications of the present invention are possible in light of the above teaching. It is therefore to be understood that within the scope of the appended claims the invention may be practiced otherwise than as specifically described.

What is claimed is:

1. A temperature control apparatus for a vehicle having a vehicle body with an opening formed therein, said temperature control apparatus comprising:
   an opening/closing door member capable of opening and closing actions relative to the opening formed in the vehicle body;
   a heat source provided in the vehicle body;
   a heat pipe disposed within the opening/closing door member for transmitting heat from the heat source; and
   a heat transmission mechanism for thermally connecting the heat pipe and the heat source when the opening is closed by the opening/closing door member, the heat transmission mechanism comprising:
   a hollow case operatively attached to the door member;
   a push bar formed of thermally conductive material and slidably disposed within the case; and
   a spring formed of thermally conductive material and disposed within the case, the spring extending between the push bar and an end portion of the heat pipe.

2. The temperature control apparatus of claim 1, wherein an accommodating part is provided proximate to a peripheral edge part of the opening, the heat source is disposed in the accommodating part, and the accommodating part has a connecting opening facing the heat transmission mechanism.

3. The temperature control apparatus of claim 1, wherein the opening/closing door member comprises a lining, the heat pipe is mounted on the lining using a mounting piece, and the lining having the heat pipe is mounted on the opening/closing door member.

4. The temperature control apparatus of claim 3, wherein a shutter is provided in the lining to permit air flow therethough, and the lining has a fan for guiding heat from the heat pipe toward the shutter provided in the lining.

5. The temperature control apparatus of claim 1, wherein the push bar is urged by a spring force of the spring in a direction toward the heat source so as to be connected with the heat source.

6. The temperature control apparatus of claim 4, wherein the shutter is disposed proximate a window provided in the opening/closing door member.

7. The temperature control apparatus of claim 4, wherein the shutter has a shielding blade capable of opening and closing actions.

8. The temperature control apparatus of claim 1, wherein the heat transmission mechanism comprises hinges for connecting the opening/closing door member and the vehicle body so that the hinges on the vehicle body are capable of transmitting heat from the heat source and the hinges on the opening/closing door member are capable of transmitting the heat to the heat pipe.

9. The temperature control apparatus of claim 1, wherein the heat transmission mechanism comprises a latch formed of a heat-transmitting material and provided to one of the opening/closing door member and the vehicle body, and a striker formed of a heat-transmitting material and provided to the other one of the opening/closing door member and the vehicle body for engaging with the latch, so that the heat source and heat pipe are capable of transmitting heat upon engagement of the latch and striker.

10. The temperature control apparatus of claim 1, wherein the heat source is designed to heat or cool the heat pipe.

11. A temperature control apparatus for a vehicle, comprising:
    a door member capable of opening and closing actions relative to an opening formed in a body of the vehicle;
    a heat source provided in the vehicle body;
    a heat pipe disposed within the door member for transmitting heat from the heat source; and
    a heat transmission mechanism for thermally connecting the heat pipe and the heat source when the opening is closed by the door member, the heat transmission mechanism comprising:
    a hollow case operatively attached to the door member;
    a push bar formed of thermally conductive material and slidably disposed within the case, the push bar having a distal end part extending outwardly through an opening formed in a front edge portion of the door member and configured to contact the heat source when the door member is closed; and
    a spring formed of thermally conductive material and disposed within the case, the spring extending between the push bar and an end portion of the heat pipe, wherein the spring is compressed by the push bar when the door member is closed.

* * * * *